United States Patent
Zirwas et al.

(10) Patent No.: US 8,649,796 B2
(45) Date of Patent: Feb. 11, 2014

(54) METHOD AND DEVICE FOR DETERMINING A COOPERATION AREA

(75) Inventors: Wolfgang Zirwas, München (DE); Wolfgang Mennerich, München (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/505,901

(22) PCT Filed: Nov. 4, 2009

(86) PCT No.: PCT/EP2009/064612
§ 371 (c)(1),
(2), (4) Date: Jul. 13, 2012

(87) PCT Pub. No.: WO2011/054380
PCT Pub. Date: May 12, 2011

(65) Prior Publication Data
US 2012/0289240 A1   Nov. 15, 2012

(51) Int. Cl.
*H04W 88/02* (2009.01)
(52) U.S. Cl.
USPC ....................................................... 455/452.1
(58) Field of Classification Search
USPC ............... 455/452.1, 525, 436; 370/252, 330, 370/329; 702/122
See application file for complete search history.

(56) References Cited

U.S. PATENT DOCUMENTS

| | | | | |
|---|---|---|---|---|
| 8,295,395 B2* | 10/2012 | Mueck et al. | ................. | 375/296 |
| 8,379,574 B2* | 2/2013 | Hilborn | ......................... | 370/328 |
| 2010/0216456 A1* | 8/2010 | Fried et al. | ..................... | 455/425 |
| 2012/0021753 A1* | 1/2012 | Damnjanovic et al. | ....... | 455/450 |
| 2013/0039194 A1* | 2/2013 | Siomina et al. | ............... | 370/252 |

OTHER PUBLICATIONS

R1-091193, 3GPP TSG-RAN WG1 Meeting #56bis, Seoul, Korea, Mar. 16-20, 2009, "UE Measurement and Feedback for DL CoMP" LG Electronics, 3 pgs.
R1-091354, 3GPP TSG-RAN WG1 Meeting #56bis, Seoul, Korea, Mar. 23-27, 2009, "Setup of CoMP cooperation areas", Nokia Siemens Networks, Nokia, 4 pgs.
R1-092838, 3GPP TSG-RAN WG1 Meeting #57bis, Los Angeles, USA, Jun. 29-Jul. 3, 2009, "Adaptive Cell Clustering for CoMP in LTE-A", Hitachi Ltd., 6 pgs.

* cited by examiner

*Primary Examiner* — Diane Mizrahi
(74) *Attorney, Agent, or Firm* — Harrington & Smith

(57) ABSTRACT

A method and a device for determining a cooperation area for a mobile terminal in a cellular network, wherein the mobile terminal determines its n strongest interferers; wherein the cooperation area is selected for the mobile terminal regarding the n strongest interferers; and wherein the cooperation area includes m base stations and wherein the number m of base stations is larger than the number n of strongest interferers. Furthermore, a communication system is suggested including said device.

15 Claims, 7 Drawing Sheets

METHOD AND DEVICE FOR DETERMINING A COOPERATION AREA

The invention relates to a method and to a device for determining a cooperation area for a mobile terminal in a cellular network.

For LTE Advanced (LTE-A), a so-called coordinated multi point (CoMP) transmission is a study item with the goal to overcome inter cell interference limitations. High performance gains can be expected from joint precoding solutions, where precoded data are simultaneously transmitted from several base stations (eNBs) to several mobile terminals (UEs).

The best performance may be achieved in case of a full network wide cooperation, but this would require channel estimation from all eNBs to all UEs, feedback of such huge amount of information from the UEs to the eNBs as well as multicasting of user data from all UEs to all eNBs. To reach a feasible data load and complexity, practical systems therefore utilize cooperation areas (CAs), which are defined to limit cooperation to a few adjacent cells.

According to a conventional solution, one eNB is regarded as a central unit (CU), which provides all the preprocessing and precoding within the CA and sends the precoded transmission signals to all other eNBs of the CA. This solution requires that channel state information (CSI) from all eNBs is sent to the CU and preprocessed data are sent back from the CU to the eNBs of the CA. If the eNBs are allocated at different sites, transfer of data has to be done over backhaul links (so-called X2 interface), which may lead to transmission delay. Also, the added overhead on the backhaul links for exchanging user data between all cooperating eNBs may be a significant load to the network.

CAs can be defined network centric (also referred to as network centric cooperation): There are predefined sets of cells, which will cooperate. As soon as one UE has selected one of the cells as its serving cell (based on wideband pathloss or RSRP measurements) this UE will be served by the respective pre-defined CA. Depending on the location of the UE within the cell, the UE will recognize different cells as strongest interferers; hence, the predefined set of cells of the CA may not cancel these strongest interferers. Therefore, network defined CAs provide only a limited performance gain.

Higher gains may be achieved via user centric (UE centric) CAs (also referred to as user centric cooperation): The UEs report their n strongest interferers (typically wideband); then, the CAs are set up according to the cells of these n strongest interferers (sIFs). By this procedure the maximum gain of the cooperation can be achieved.

Due to shadowed conditions (e.g., at least partially blocked signals by buildings, trees, etc.); interfering cells could be cells that are located far-off. Hence, it may be unlikely to determine other UEs that report the same set of cells as sIFs. It is therefore difficult to generate user centric CAs in practical systems.

High performance CoMP solutions rely on multi user CoMP (MU CoMP), wherein for all cells UEs are served simultaneously and wherein zero forcing (ZF) as well as precoding assures an (at least partially) interference free transmission to all UEs of the CA. In case of line of sight (LOS) scenarios, large gains could be achieved. In particular, network predefined CAs can be used with considerably good results as the LOS condition ensures that most interference is originated by nearby cells.

In case of strong shadowing effects, far-off eNBs may increasingly contribute as sIFs. Starting with a first UE, 3 eNBs can be selected as sIFs to define a CA, wherein these 3 eNBs may be widely scattered. Due to the shadowing conditions, however, there is only a small likelihood that any other UE will perceive the same eNBs as sIFs. Hence, the UEs cannot be served with their desired eNB constellation.

This predicament may be solved by using network predefined CAs, where UEs are assigned to CAs depending on the respective UE's serving eNB without considering specific interference conditions for each UE. This approach, however, bears the disadvantage that most of the possible gain is typically not achieved, because inter CA interference is not suppressed and such inter CA interference may contain one of the sIFs. In such a scenario, the CA may cancel interferers of low order, whereas at least one sIF provides a significant amount of disturbance, which is not considered. Therefore, the network centric approach only provides rather limited gain.

This leads to the following predicament: User centric cooperation is required to really leverage the high effort spent for joint precoding, but leads to network wide precoding, reporting and user data distribution over the backbone. At the same time practical systems have a hard requirement to limit cooperation to very few, typically 3 or 5, cells.

Techniques known as active interference management help to alleviate the issue of inter CA interference by means of antenna tilting, interference coordination, switching off of certain eNBs (some form of diversity) or interference rejection combining at the UE side. However, these techniques do not provide performance gains compared to those achievable by user centric cooperation.

The problem to be solved is to overcome the disadvantages stated above and in particular to allow for user centric cooperation gains in practical system implementations with a reduced complexity regarding processing effort and a reduced network (e.g., backhaul) load.

This problem is solved according to the features of the independent claims. Further embodiments result from the depending claims.

In order to overcome this problem, a method is provided for determining a cooperation area (CA) for a mobile terminal in a cellular network,
- wherein the mobile terminal determines its n strongest interferers;
- wherein the cooperation area is selected for the mobile terminal regarding the n strongest interferers;
- wherein the cooperation area comprises m base stations and wherein the number m of base stations is larger than the number n of strongest interferers.

The solution provided may relate to 3GPP LTE Release 8, 9 or 10. In addition, the solution may also be applicable to technologies other than LTE; in such case, parameters and procedures may have to be adapted to the respective technology, interfaces and architecture.

It is noted that the n strongest interferers may be a selection out of the m base stations of the cooperation area.

It is further noted that the selection of the cooperation area may be conducted by the mobile terminal or by a base station, in particular by a serving base station. The serving base station may be a central unit of the cooperation area or a central unit within the cellular network.

It is also noted that all interferers within a power window, e.g., relative to serving cell may be determined and/or reported by the mobile terminal.

In particular, said "n strongest interferers" may be all interferers within a certain power window. In addition, different power windows for different mobile terminals may apply.

For example, m may amount to 9 and n may amount to 3. Base stations may be deployed at sites, wherein a site may contain, e.g., 3 base stations. It is noted that different numbers for sites, m and n may be applicable as well.

With regard to LTE terminology, the base station can be referred to as eNB and the mobile terminal can be referred to as UE.

This proposal bears the advantage of a high probability to determine several mobile terminals that determine n strongest interferers within the same cooperation area comprising m base stations (or cells). This probability is considerably higher than in a scenario where n equals m.

It is noted that the mobile terminal may be any device with a wireless interface to communicate with the mobile network. Such device may be a cellular phone, a (laptop) computer, a handheld device (e.g., personal digital assistant), a car with a mobile interface or the like.

In an embodiment, the cooperation area is selected from several cooperation areas, wherein the several cooperation areas allocate different resources.

In particular, each of the several cooperation areas may allocate a particular resource that may be used for serving mobile terminals that are associated with this particular cooperation area.

In another embodiment, the different resources allocated by the several cooperation areas are different frequency bands and/or different timeslots.

In a further embodiment, the n strongest interferers are a subset of the m base stations.

In a next embodiment, the mobile terminal determines its n strongest interferers by measuring RSRP values.

Such measured RSRP values can be compared with each other in order to determine the strongest interferers.

It is also an embodiment that the cooperation area is selected for the mobile terminal by
reporting the n strongest interferers to a serving base station;
setting the mobile terminal to the cooperation area by the serving base station.

Hence, the serving base station may determine which is the best cooperation area for the respective mobile terminal based on the n strongest interferers reported. The cooperation area may be chosen for which as many of the n interferers as possible are part of the cooperation area that may be selected from several cooperation areas allocating different resources.

It is noted that the serving base station may thus utilize several mobile terminals. In particular, several mobile terminals can be assigned to one or more cooperation area(s). Several cooperation areas may utilize different resources, e.g., frequency bands and/or time slots.

Based on the cooperation area selection, the serving base station may define resources (e.g. subband sizes) depending on the number of mobile terminals associated with this particular cooperation area. Reporting details may be conveyed towards the mobile terminal(s) via a downlink control channel. The mobile terminal(s) may then start reporting on the resource allocated in a reporting mode set forth by the serving base station. The base station gathers reports from the mobile terminal(s) in this particular cooperation area and determines precoding measures as well as utilizes the cooperation area (in particular all base stations of the cooperation area) for transmitting data.

Pursuant to another embodiment, the cooperation area is selected for the mobile terminal by the following steps:
a serving base station broadcasts information regarding potential cooperation areas towards the mobile terminal prior to the mobile terminal determining its n strongest interferers;
the mobile terminal determines a fitting cooperation area from the potential cooperation areas provided by the serving base station;
the mobile terminal informs the serving base station of the fitting cooperation area.

As stated above, based on the cooperation area selection, the serving base station may define resources (e.g. subband sizes) depending on the number of mobile terminals associated with this particular cooperation area. Reporting details may be conveyed towards the mobile terminal(s) via a downlink control channel. The mobile terminal(s) may then start reporting on the resource allocated in a reporting mode set forth by the serving base station. The base station gathers reports from the mobile terminal(s) in this particular cooperation area and determines precoding measures as well as utilizes the cooperation area (in particular all base stations of the cooperation area) for transmitting data.

According to an embodiment, the fitting cooperation area is determined by the mobile terminal based on the n strongest interferers.

For example, the fitting cooperation area may be the cooperation area out of several cooperation areas with the strongest interferers. If n strongest interferers are determined for various cooperation areas, any of these cooperation areas might be chosen for this mobile terminal. In case the mobile terminal can estimate and/or calculate the SINR after cooperation (after CoMP SINR processing) for each possible cooperation area, it might be advantageous to select the cooperation area with the highest SINR after CoMP processing. As an alternative, the mobile terminal may convey the SINR after CoMP processing, e.g., the CA(s) with the best SINR or an achievable SINR for different CAs.

According to another embodiment, antenna tilting is applied to at least a portion of the m base stations.

Antenna tilting localizes interference to nearby eNBs and avoids or minimizes interference from far-off base stations.

In yet another embodiment, the cooperation area is used for precoding purposes and/or joint processing.

It is noted that the cooperation area can be used for precoding by processing all downlink data to be conveyed towards the mobile terminals of the cooperation area in a way to increase the overall gain of the radio channels. In particular, each base station of the cooperation area may pre-process the data signals in a way to allow for a reduced interference at the mobile terminals. Each base station may in particular use its at least one antenna to convey the signals towards the mobile terminals.

According to a next embodiment, radio channels that are not reported by the mobile terminal are set to zero.

Hence, as the mobile terminal only reports the n out of m strongest interferers, the remaining radio (m-n) channels may be set to zero. This significantly reduces the complexity of precoding.

The problem stated above is also solved by a device for determining a cooperation area for a mobile terminal in a cellular network comprising or being associated with a processing unit that is arranged to execute the following step:
the cooperation area is selected for the mobile terminal regarding n strongest interferers determined by the mobile terminal,
wherein the cooperation area comprises m base stations and
wherein the number m of base stations is larger than the number n of strongest interferers.

It is noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

According to an embodiment, the processing unit is arranged to execute the step of broadcasting information regarding potential cooperation areas towards the mobile terminal.

In addition, any of the above-mentioned steps of the method may be executed on the processing unit in an according manner.

It is also an embodiment that said device is a communication device, in particular a base station or a serving base station of the cellular network. It may in particular be based on an eNB of an LTE or LTE-A network.

The problem stated above is also solved by a device for determining a cooperation area in a cellular network comprising or being associated with a processing unit that is arranged to execute the following steps:
  determining the n strongest interferers;
  conveying information regarding the n strongest interferers towards a serving base station or selecting a cooperation area with regard to the n strongest interferers determined;
  wherein the cooperation area comprises m base stations and wherein the number m of base stations is larger than the number n of strongest interferers.

Pursuant to an embodiment, said device is a mobile terminal, in particular a user equipment (UE) of the cellular network.

The problem stated supra is further solved by a communication system comprising at least one device as described herein.

The solution provided herein further comprises a computer program product directly loadable into the internal memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Figure 5:
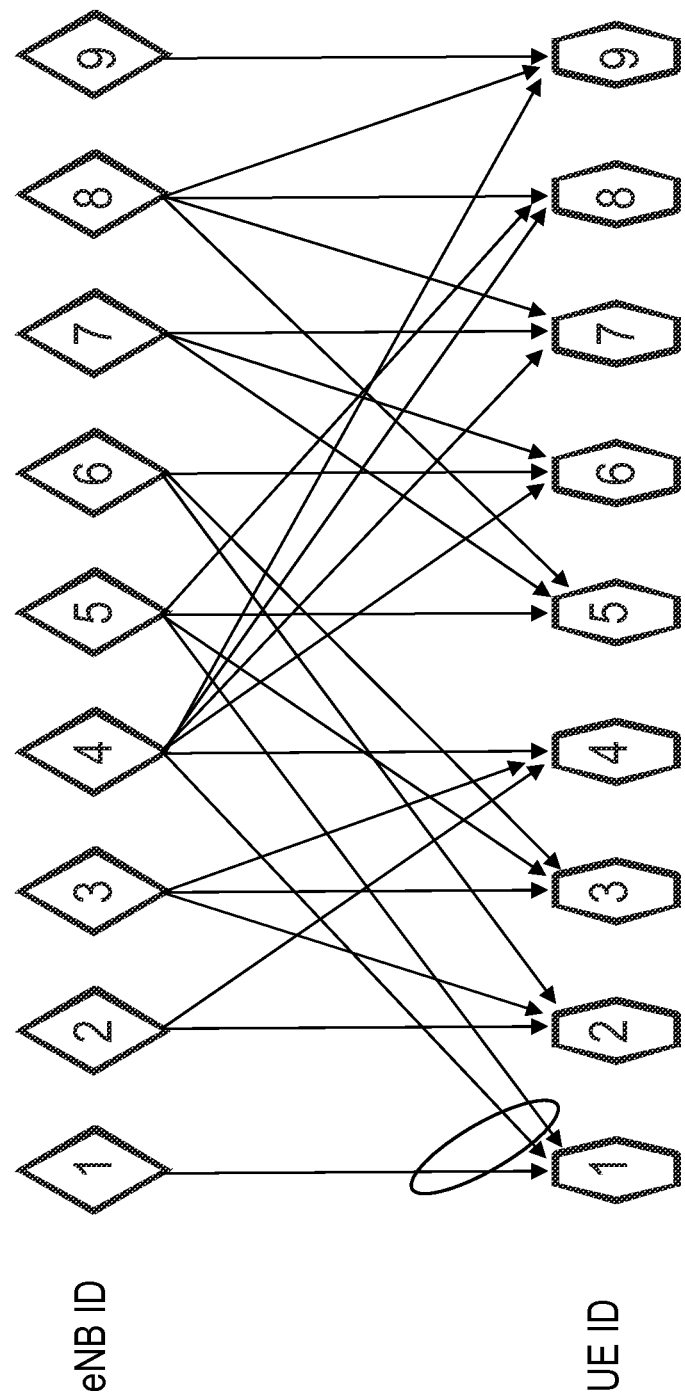
Figure 6:
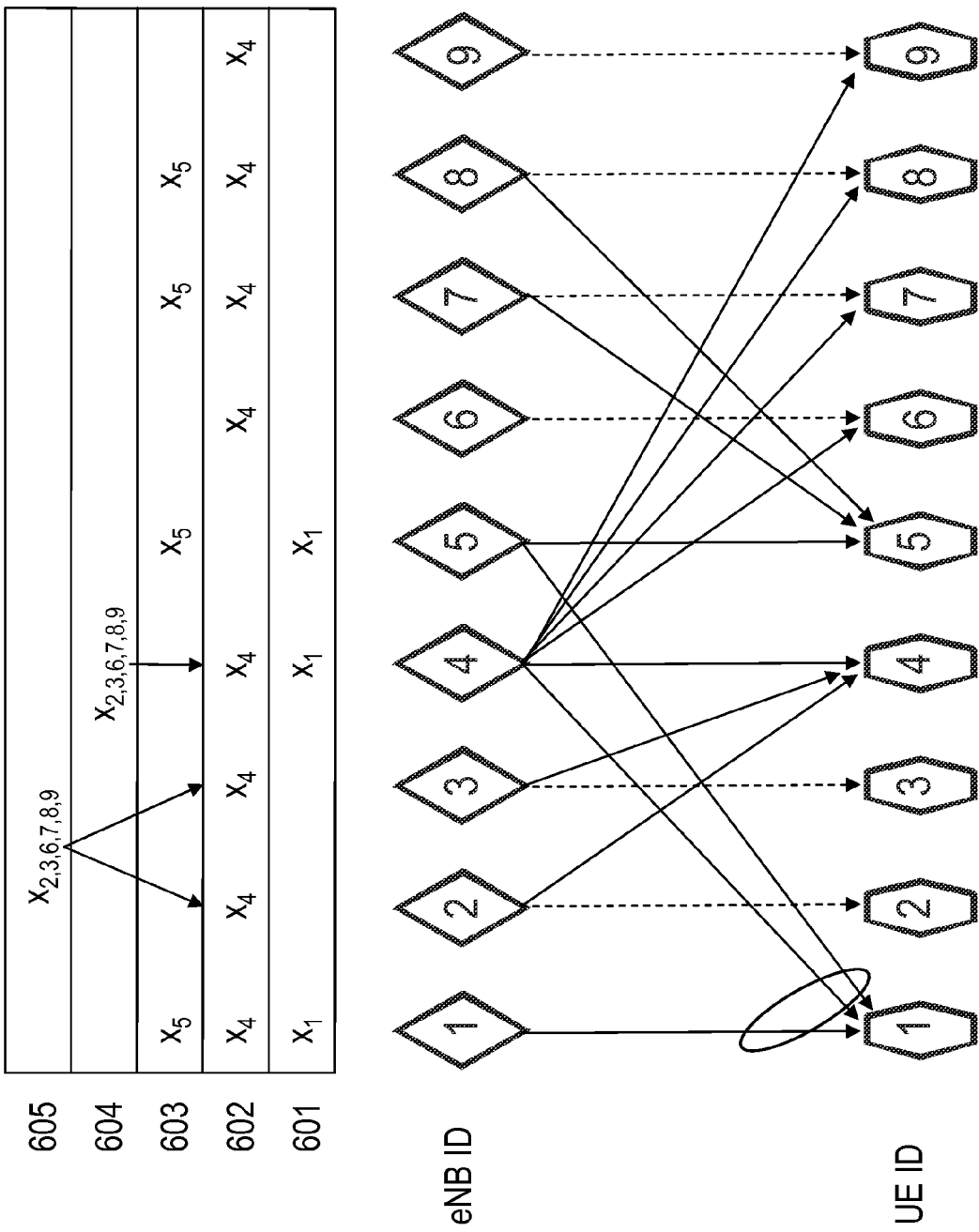
Figure 7:
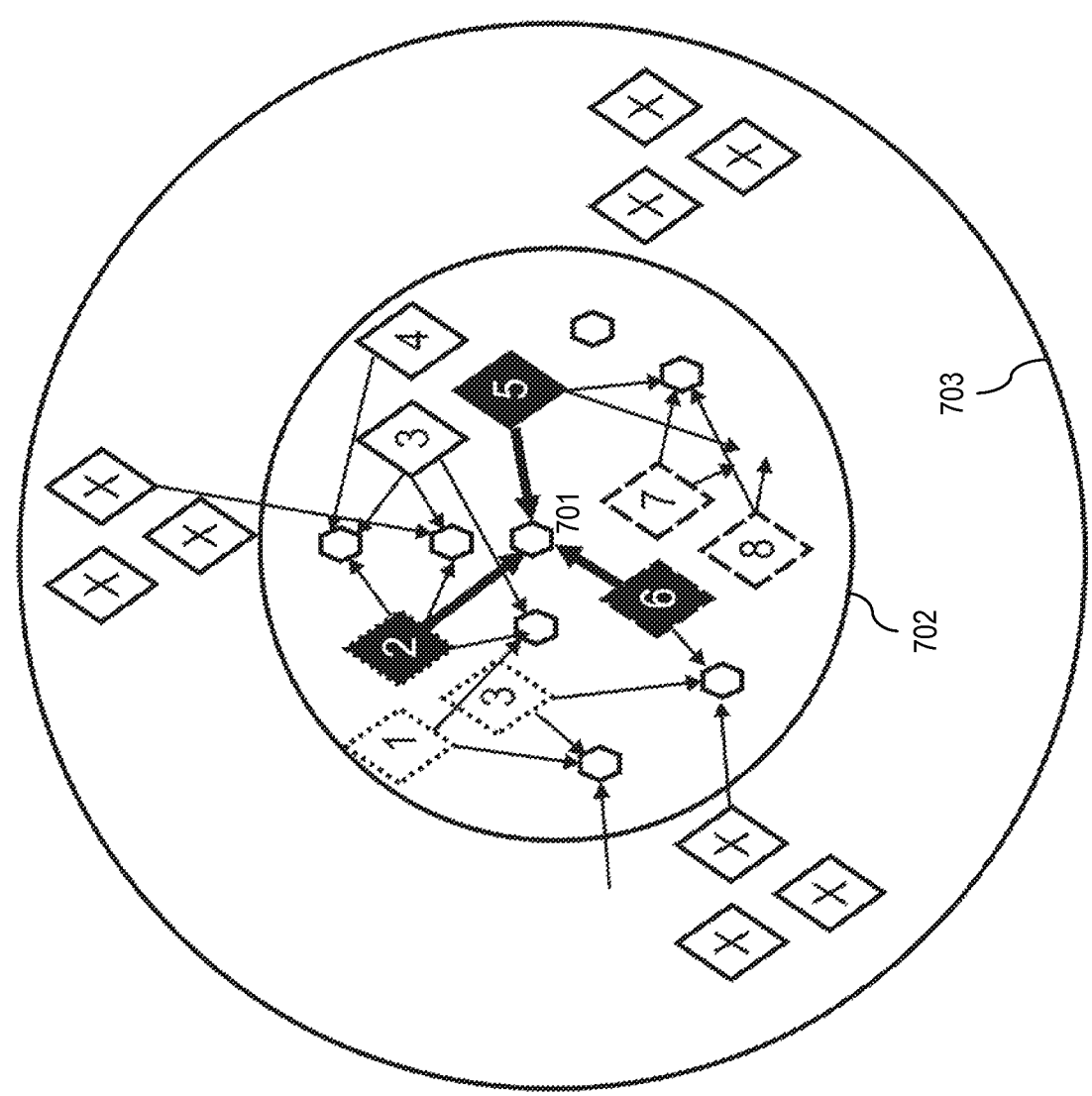

FIG. 5 shows a schematic diagram comprising 9 eNBs with identifications (IDs) reaching from 1 to 9 and 9 UEs with IDs from 1 to 9, wherein each UE is served by the eNBs that are the strongest interferes for this particular UE;

FIG. 6 shows one CA of size 9 and its mutual interactions in case of partial cooperation over 3 strongest eNBs per UE;

FIG. 7 shows a schematic diagram comprising a CoMP measurement-, cooperating- and/or reporting set and CoMP transmission points for a single UE.

The approach provided herein combines different means in such a way that user centric performance gains can be achieved also with a moderate number of total UEs being present.

This approach may also utilize (strong) antenna tilting to assure that interference is limited to a few cells (i.e. to a few eNBs). As a result, primarily UEs located at the cell edges are affected by multi cell interference. These UEs are promising candidates for the benefits of joint processing (JP).

For example, 2 or 3 sites may be utilized to cooperate, wherein each site may serve at least 3 cells (or eNBs). Hence, assuming a size of 3 sites with 3 cells each, a cooperation area (CA) results in 9 cells. In combination with the antenna tilting, the large size of the CA provides a significantly increased probability that for a UE the 3 sIFs are situated inside of this CA.

Figure 1B:
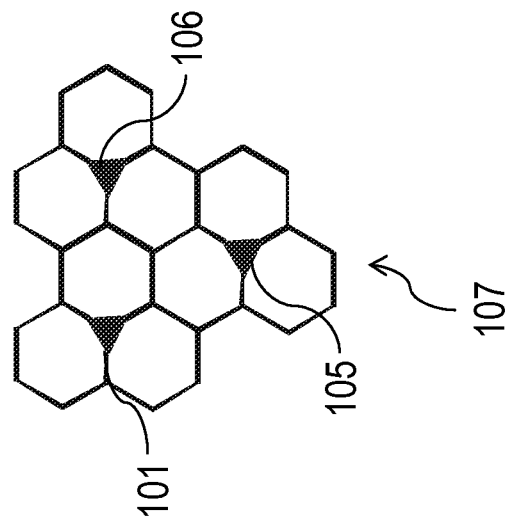
FIG. 1B shows three sites that are combined to a cooperation area.
Figure 1A:
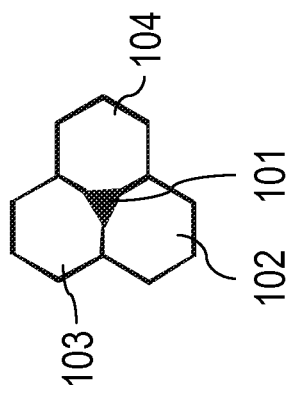
FIG. 1A shows a site comprising 3 cells.

FIG. 1A shows a site 101 comprising 3 cells 102 to 104 and

FIG. 1B shows three sites 101, 105 and 106 that are combined to a cooperation area 107.

Figure 2:
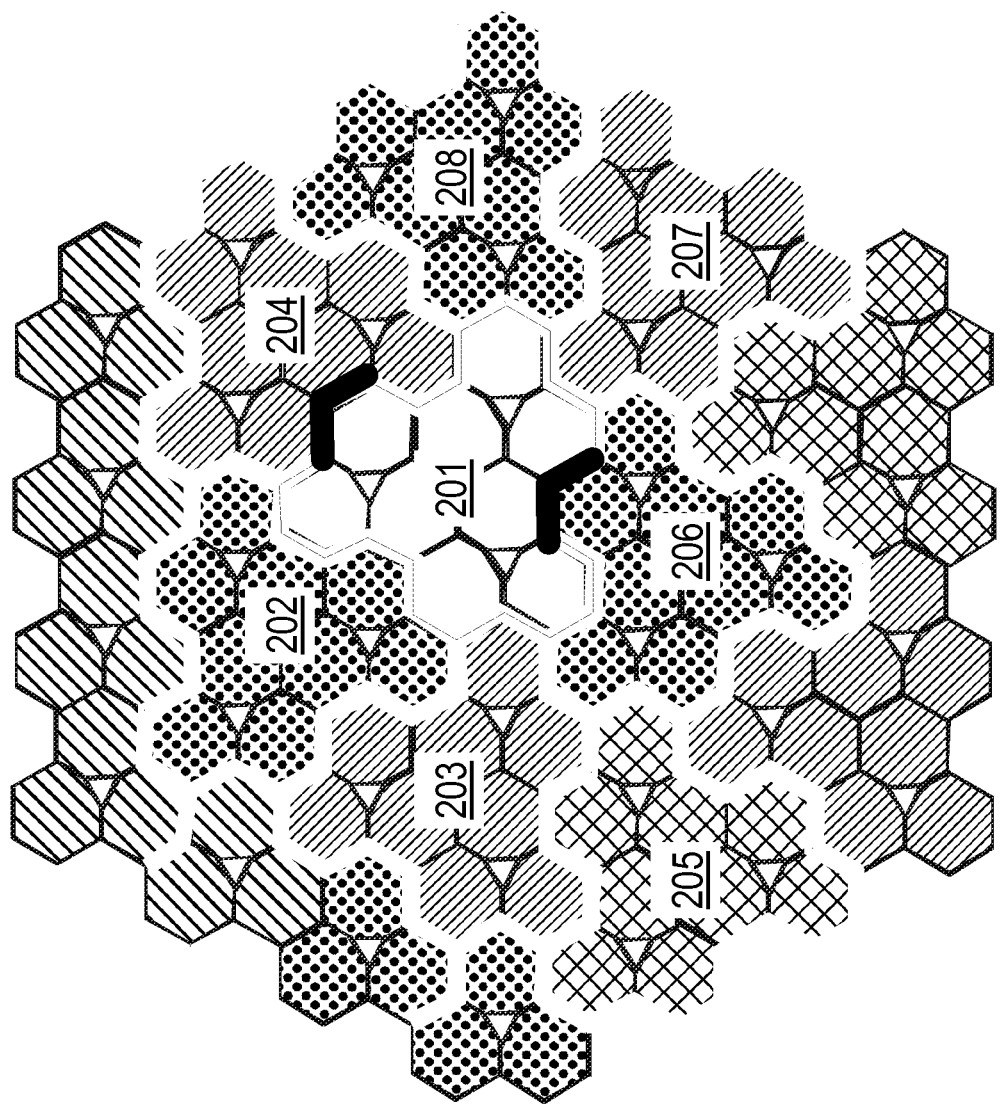
FIG. 2 shows a schematic diagram visualizing a part of a cellular network with several CAs, wherein a CA comprises 3 sites as indicated in FIG. 1B.

FIG. 2 shows a schematic diagram visualizing a part of a cellular network with several CAs, wherein a CA comprises 3 sites as indicated in FIG. 1B. FIG. 2 shows a CA 201 with several surrounding cooperation areas 202 to 208.

Nested CoMP Areas

Nested coordinated multi point (CoMP) means that several user centric defined CAs (e.g., of a size amounting to 3 sites) cooperate, at least in a limited area of the network. The limited area of the network might be 3 sites as mentioned above with 3 or 6 cells each so that the overall area is of size 9 cells or 18 cells.

For precoding purposes, the size 3 cooperation areas as well as the inter CA interference within the limited area is considered in order to overcome the inter CA interference limitation.

In other words, the UEs report only the 3 sIFs within the CA, while radio channels to the other (9−3=) 6 cells are set to zero. This leads to a sparse channel matrix for precoding as well as for a reduced amount of data to be transferred over the backbone network.

The benefit of this solution is that the UEs that select any set of 3 eNBs out of the 9 cells of the CA can be regarded as group and may be served simultaneously with reduced interference (due to precoding). In addition, the probability finding several UEs that share any 3-out-of-9 sIFs is significantly higher than finding several UEs that share the same 3-out-of-3 sIFs. This helps to overcome the challenge to find enough UEs to be grouped together for precoding purposes.

In addition, the issue of inter CA interference is solved with the approach presented herein: Still, there is CAs with quite a large number of UEs located on the edge of the size 9 CoMP area. For these UEs there is a high probability that they determine sIFs that are located within different CAs, which may deteriorate the achievable system level gains.

To overcome this issue it is suggested applying different sets of cooperating eNBs, e.g., either in different frequency bands or in different time slots.

Figure 3:
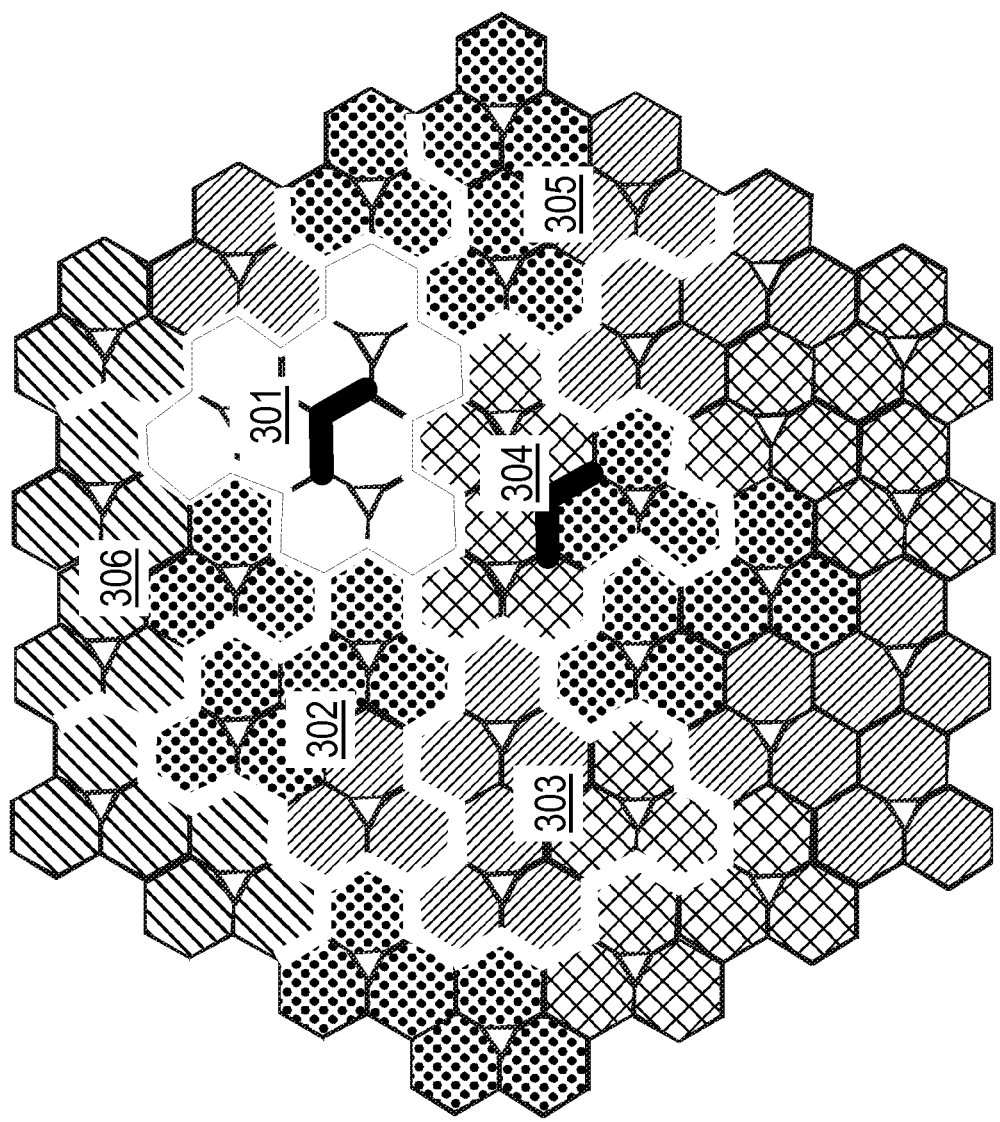
FIG. 3 shows a schematic diagram of the cellular network of FIG. 2, wherein the CA is shifted one cell upwards and the UEs that have been located on the edge between the CAs are located within a center area of the shifted CAs.

In FIG. 2, connected cells with the same pattern indicate a CA for the first frequency subband. The black portions between CAs 201 and 206 and between CAs 201 and 204 indicate UEs that are located on the edge between the respective CAs. The CA is shifted one cell upwards and the UEs that have been located on the edge between the CAs are located within a center area of the shifted CAs. This is visualized by FIG. 3 showing a schematic diagram of the cellular network of FIG. 2, wherein due to a shift different CAs 301 to 306 are used: The UEs that are located on the black portion shown in FIG. 2 (also shown in FIG. 3) are in FIG. 3 no longer on the edge between CAs, but within the CAs 301 and 304.

The definition of the CAs can be regarded as a pre-selection of UEs into CAs depending on their reported set of 3 sIFs.

FIG. 2 and FIG. 3 indicate as how to combine different adjacent sites to provide for all UEs that are located on or around a CA edge, a CA configuration, where the UEs are located within the CA (in particular at or around a center of the CA).

In the example according to FIG. 2 and FIG. 3, five different configurations are required to serve all UEs that are located on the edges between the CA 201 and one of its adjacent CA 202 to 208.

It is noted that the structure shown in FIG. 2 and FIG. 3 (see also FIG. 1A and FIG. 1B) comprises several base stations (eNBs), that may be at least partially regarded as serving base stations (e.g., one serving base station per CA) and could be implemented by a person skilled in the art as a single physical unit, as several physical components or it could be associated or arranged with an existing logical or physical entity. The base station may comprise logical entities that may be deployed as program code, e.g., software and/or firmware, running on a processing unit, e.g., a computer, microcontroller, ASIC, FPGA and/or any other logic device.

Figure 4B:
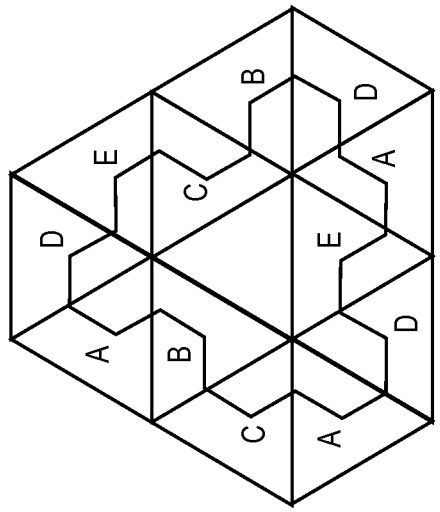
FIG. 4B shows an edge of the CA of FIG. 4A, wherein the overlay triangles indicate the positions of sites according to FIG. 4A.
Figure 4A:
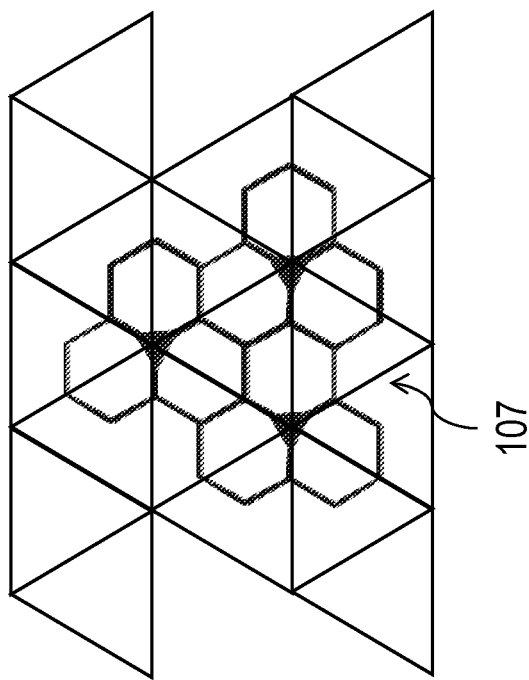
FIG. 4A shows the CA of FIG. 1B with an overlay of triangles, wherein each triangle indicates adjacent sites that are connected.

FIG. 4A shows the CA 107 of FIG. 1B with an overlay of triangles, wherein each triangle indicates adjacent sites that are connected. The CA 107 has an edge that is depicted in FIG. 4B, wherein the overlay triangles indicate the positions of sites according to FIG. 4A. When a cell shift of one cell is conducted in various directions from the CA 107 there are 6 different cell combinations A to E, each of which can be used for UEs being located on or around the edge portion A to E of the CA 107. Each edge portion is associated with a triangle. Hence, it is possible to provide five different resources or subbands to ensure that the UEs are not located on the edge of a CA.

It is noted that in real network scenarios, a self optimizing network (SON) mechanisms could be utilized in order to specifically adapt to real channel conditions.

It is further noted that despite the different configuration of the CAs for different frequency subbands and/or time slots, the CAs per subband fill the whole network plane. Hence, in each frequency subband up to 9 UEs can be served simultaneously so it is a real frequency reuse 1 system; hence, the system serves a full MU CoMP transmission. For that purpose 9 UEs are selected, each reporting 3 eNBs out of the possible 9 eNBs as sIFs; the UEs are served simultaneously by the 9 eNBs.

FIG. 5 shows a schematic diagram comprising 9 eNBs with identifications (IDs) reaching from 1 to 9 and 9 UEs with IDs from 1 to 9. Each UE is served by the eNBs that are the strongest interferes for this particular UE. A preselection of UEs to resources (frequency subbands or timeslots) may be applied so that all sIFs are within a CA of size 9.

In this example, for each UE there are only 3 particularly relevant eNBs. This has the benefit that while the overall CA is of size 9 the reporting of CSI values can be limited to 3 cells, i.e. 3 to 6 channel components (6 in case 2 streams per UE or cell are transmitted). This implementation is in particular of advantage as an uplink (UL) feedback capacity may be limited. The remaining channel components for each UE to the other 6 eNBs of the CA may not be reported and can be set to zero at the eNB.

It is also possible to transmit a different number of channel state information (CSI) values depending on the UE's uplink capacity as well as the number of sIFs for this UE being part of the size 9 CA. The UL capacity may vary due to different channel conditions (long term) or due to variable compression ratios (short term). Hence, the number of CSI values reported (long term and/or short term) may vary, e.g., per CSI report.

Specifically, all strongest interferers could be fed back within a certain power window defined by a certain threshold, e.g., with respect to the serving cell power.

As a result of the reduced reporting, an overall channel matrix of size 9×9 is sparsely occupied due to the high number of zero elements. This enables algorithms of reduced complexity to be utilized for calculating the precoding matrices.

Combining 3 sites forming the CA of 9 cells results in a moderate amount of data conveyed as backbone overhead; in a worst case scenario, data multicasting increases by a maximum factor of 3 even in case all 9 cells require all 9 user data.

It is noted that in a modified solution with only 6 cells (i.e. 2 sites) the backbone overhead for the user data of the cooperating UEs is reduced to a factor less than 2.

FIG. 6 shows one CA of size 9 and its mutual interactions in case of partial cooperation over 3 strongest eNBs (sIFs) per UE. Such mutual interaction leads to user data multicasting of almost all user data to all eNBs. As indicated in a line 601, data $x_1$ are required at the sIFs (eNBs) 1, 4 and 5. As indicated in a line 602, data $x_4$ are required at sIFs (eNBs) 2, 3 and 4 and at eNBs 6, 7, 8 and 9, for which eNB with the ID 4 is the strongest interferer. As indicated in a line 603, data $x_5$ are required at sIFs (eNBs) 5, 7 and 8 and at eNB 1, for which the eNB with the ID 5 is the strongest interferer.

In addition, data $x_{2,3,6,7,8,9}$ are required at the eNB 4 as they affect the transmission signals to the UEs with the IDs 1, 4, 6, 7, 8, 9 (see line 604).

Furthermore, data $x_{2,3,6,7,8,9}$ are required at the eNBs 2 and 3 as it affects the transmission signals to the UE with the ID 4 (see line 605).

The sparsely occupied overall channel matrix H suggests that user data might be needed only at 3 cells (similar to restricted reporting to 3 cells), but a typical constellation as shown in FIG. 6 reveals that mutual interference between UEs may make it necessary that almost all user data will be required at almost all eNBs. Accordingly, the precoding matrix $$W = \text{pinv}(H)$$

may be less sparsely occupied than the channel matrix H. "pinv(H)" is the pseudo-inverse matrix of matrix H.

Precoding is done across all 9 cells, but the overall sparsely occupied channel matrix may allow for efficient system implementations with regard to matrix inversion for ZFlike precoding.

FIG. 7 shows a schematic diagram comprising a CoMP measurement-, cooperating- and/or reporting set and CoMP transmission points for a single UE 701. Cells 2, 5 and 6 convey CoMP transmission points to the UE 701, which is located in a CA 702 that lies within a measurement set area 703. Cells 1, 2, 3 form a site, cells 3, 4, 5 form another site and cells 6, 7, 8 form a third site within the CA 702. It is noted that said cells are also referred to as eNBs.

Hereinafter, two possible implementations A and B are described in more detail. However, the solution presented is not limited to either implementation.

Implementation: Version A a) The UE measures n sIFs and its RSRP values, typically semi statically within a measurement set.

b) The UE reports n sIFs to the serving eNB over PUCCH or PUSCH. It might report either cell IDs only or cell IDs together with RSRP values.
c) The eNB (semi statically) sets the UE into the best fitting frequency subband, where all or at least as much as possible sIFs are part of a CA of a specific subband ($CA_{SB}$). The $CA_{SB}$ is the set of 3 sites, i.e. 9 cooperating eNBs for the frequency subband (SB), with SB=1 ... 5. $CA_{SB}$s are chosen so that all UEs are located within a CA.
   For each CA a different resource, in particular frequency subband may be chosen. It is noted that the according CAs might be transparent to the UEs, i.e. the UEs might not have to be informed about their CA as the subband information can inherently be a part of the scheduling decisions.
d) The eNB defines subband sizes depending on a number of active UEs per $CA_{SB}$. The eNB informs the UEs about the reporting details via a PDCCH message. This PDCCH message may contain at least one of the following: a reporting subband (set of PRBs), cell IDs for reporting, a frequency granularity, a reporting rate, etc. Default values may be used to reduce the message size. For adaptive subband sizes the decisions may be made commonly for the whole network. Therefore, new RRM or SON messages may be used to organize the subband adaptation. Adaptive subband solutions are specifically helpful in case CoMP processing is restricted to some high load areas of the network like hot spots so that fast adaptations are possible.
e) UEs start reporting for according frequency subbands in a requested reporting mode. It is noted that in case the UEs can be served from more than one CA, the UEs may report for more than one subband to provide a higher scheduling flexibility.
f) The eNB gathers CSI reports from the UEs in the CA and determines a precoding as well as it transmits from all active transmission points.

Implementation: Version B
a) The serving eNB broadcasts possible CAs via $CA_{SB}$s (maybe in combination with its current frequency subband allocation) for its location.
b) The UE measures n sIFs and its RSRP values, typically semi statically within a measurement set.
c) The UE detects a best fitting CA $CA_{SB}$ for its sIFs.
d) The UE reports CA $CA_{SB}$.
e) The eNB defines subband sizes depending on the number of active UEs per $CA_{SB}$ and informs the UEs about the reporting details per PDCCH message. The PDCCH message may contain at least one of the following: a reporting subband (set of PRBs), cell IDs for reporting, a frequency granularity, a reporting rate, etc. Default values may be used to reduce the message size.
f) The UEs start reporting for according frequency subbands in a requested reporting mode. It is noted that in case the UEs can be served from more than one CA, the UEs may report for more than one subband to provide an according scheduling flexibility.
g) The eNB gathers CSI reports from the UEs in the CA and determines a precoding as well as it transmits from all active transmission points Hereinafter, an example is provided to show as how to define, broadcast, multicast or unicast the $CA_{SB}$s to the UEs. In a first step the cells per site are identified, e.g., by SON procedures and collected in the following table:

| Site 1 | Cell IDs: | #1 | #2 | #3 |
| Site 2 | Cell IDs: | #11 | #12 | #13 |
| Site 3 | Cell IDs: | #21 | #22 | #23 |
| Site 4 | Cell IDs: | #31 | #32 | #33 |
| Site 5 | Cell IDs: | #41 | #42 | #43 |

Preferably, due to the backbone issue typical all cells of a site may be changed per $CA_{SB}$ to limit backhaul traffic as far as possible.

Based on this knowledge, $CA_{SB}$s as being used per frequency subband or subframe are a predefined combination of site IDs from the table above leading to the following table:

| CA1 | site 1, 2, 3 |
| CA2 | site 1, 4, 5 |
| CA3 | site 2, 4, 3 |
| CA4 | site 2, 3, 5 |
| CA5 | site 1, 2, 4 |

Hence, $CA_{SB}$s can be uniquely identified by a single CA ID (for 5 $CA_{SB}$ this requires only 3 bits) identifying the according 9 cell IDs. A significant reduction in control overhead can be achieved. Due to such reduced control overhead, frequency subbands can be adapted more often.

The same scheme could be used for organizing the multicasting of user data to all cooperating sites over the backhaul network as well, i.e. for each UE the routers can be informed about the sites that are used for multicasting purposes.

(Further) Advantages and Benefits:

Due to a strong antenna tilting, interference is concentrated or to some extent restricted to adjacent eNBs.

A CA can be of considerably large size (e.g., comprise 9 cells). This simplifies a user grouping as a probability increases that several UEs find 3 strongest cells out of 9 cells instead out of 3 cells.

Resources are defined for each CA, e.g., frequency-bands (subbands) and/or timeslots. Hence, each UE may be assigned to a CA so that this UE is rather in the center of a CA than on the edge of a CA. This way, a high percentage of UEs can be served in user centric mode and only a small fraction of CA edge UEs may experience a reduced performance gain.

The implementation efforts are limited, in particular regarding feedback per UE to relevant eNBs.

The precoding overhead is reduced by setting radio channels that are not (to be) reported to zero. The precoding is thus restricted to the most relevant eNBs (sIFs).

Advantageously, multicasting of data over backbone to relevant eNBs is reduced.

The concept provides improved user centric cooperation (JP) performance gains. Due to subband specific cooperation areas $CA_{SB}$ nearly all UEs of the network can be served as CA-centered UEs (instead of UEs being located on the edges of the CAs). In combination with strong antenna tilting, only a small fraction of the UEs may not be served in user centric mode due to more far-off interfering eNBs. No complex cell selection algorithms are required.

List of Abbreviations:
A&F Amplify and Forward
BS Base Station
CA Cooperation Area
CDD Cyclic Delay Diversity
CoMP Coordinated Multi Point
CSI Channel State Information
CU Central Unit D&F Decode and Forward
DL Downlink
eNB evolved Node B
FDD Frequency Division Duplexing
GI Guard Interval
HARQ Hybrid Automatic Repeat Request
ID Identification/Identifier
IRC Interference Rejection Combining
JP Joint Processing
LOS Line of Sight
MCS Modulation and Coding Scheme
MIMO Multiple Input Multiple Output
MS Mobile Station
NB Node B
OFDM Orthogonal Frequency Division Multiplexing
OFDMA Orthogonal Frequency Division Multiple Access
PDCCH Physical Downlink Control Channel
PRB Physical Resource Block
PUCCH Physical Uplink Control Channel
PUSCH Physical Uplink Shared Channel
R8 Release 8
RB Resource Block
RN Relay Node
RRM Radio Resource Management
RS Reference Signal
RSRP Reference Signal Received Power
SB Subband
SC Subcarrier
sIF Strongest Interferer
SL System Level
SON Self Optimizing Network
SU Single User
TDD Time Division Duplexing
TDM Time Domain Multiplexing
UE User Equipment
UL Uplink
ZF Zero Forcing

The invention claimed is:

1. A method for determining a cooperation area for a mobile terminal in a cellular network,
   wherein the mobile terminal determines a number of strongest interferers with the mobile terminal;
   wherein the cooperation area is selected for the mobile terminal regarding the number of strongest interferers;
   wherein the cooperation area comprises a number of base stations and wherein the number of base stations is larger than the number of strongest interferers.

2. The method according to claim 1, wherein the cooperation area is selected from several cooperation areas, wherein the several cooperation areas allocate different resources.

3. The method according to claim 2, wherein the different resources allocated by the several cooperation areas are different frequency bands, different timeslots, or both different frequency bands and different timeslots.

4. The method according to claim 1, wherein the number of strongest interferers are a subset of the number of base stations.

5. The method according to claim 1, wherein the mobile terminal determines the number of strongest interferers with the mobile terminal by measuring Reference Signal Received Power values.

6. The method according to claim 1, wherein the cooperation area is selected for the mobile terminal by
   reporting the number of strongest interferers to a serving base station;
   setting the mobile terminal to the cooperation area by the serving base station.

7. The method according to claim 1, wherein the cooperation area is selected for the mobile terminal by the following steps:
   a serving base station broadcasts information regarding potential cooperation areas towards the mobile terminal prior to the mobile terminal determining the number of strongest interferers with the mobile terminal;
   the mobile terminal determines the fitting cooperation area from the potential cooperation areas provided by the serving base station;
   the mobile terminal informs the serving base station of the fitting cooperation area.

8. The method according to claim 7, wherein the fitting cooperation area is determined by the mobile terminal based on the number of strongest interferers.

9. The method according to claim 1, wherein the cooperation area is used for precoding purposes, joint processing, or both precoding purposes and joint processing.

10. The method according to claim 1, wherein radio channels of the cooperation area that are not reported by the mobile terminal are set to zero.

11. A device for determining a cooperation area for a mobile terminal in a cellular network comprising or being associated with a processing unit that is arranged to execute the following step:
    the cooperation area is selected for the mobile terminal regarding a number of strongest interferers determined by the mobile terminal,
    wherein the cooperation area comprises a number of base stations and
    wherein the number of base stations is larger than the number of strongest interferers.

12. The device according to claim 11, wherein the processing unit is arranged to execute the step of broadcasting information regarding potential cooperation areas towards the mobile terminal.

13. The device according to claim 11, wherein said device is a communication device, in particular a base station or a serving base station of the cellular network.

14. A device for determining a cooperation area in a cellular network comprising or being associated with a processing unit that is arranged to execute the following steps:
    determining a number of strongest interferers;
    conveying information regarding the number of strongest interferers towards a serving base station or selecting a cooperation area with regard to the number of strongest interferers determined;
    wherein the cooperation area comprises a number of base stations and wherein the number of base stations is larger than the number of strongest interferers.

15. The device according to claim 14, wherein said device is a mobile terminal, in particular a user equipment of the cellular network.

* * * * *